United States Patent Office 3,427,551
Patented Feb. 11, 1969

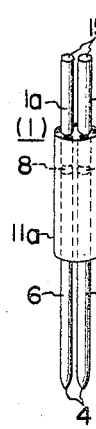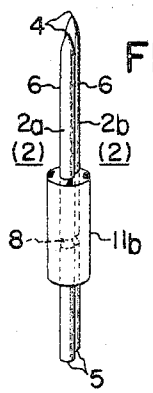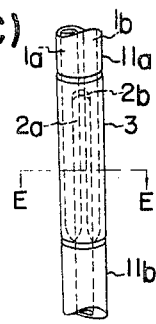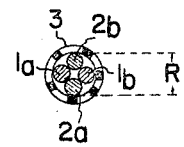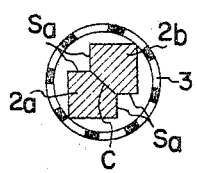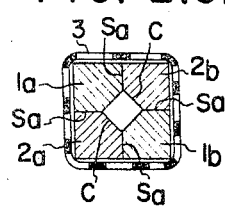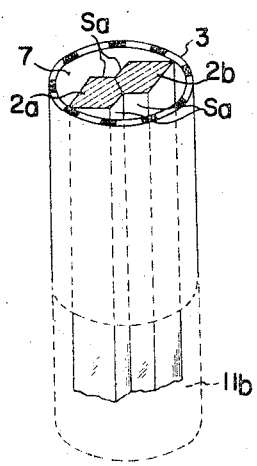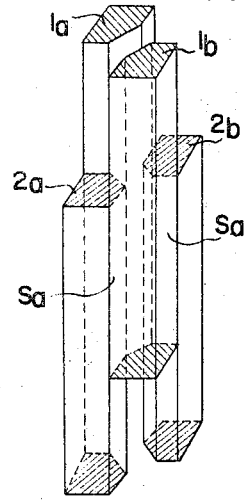

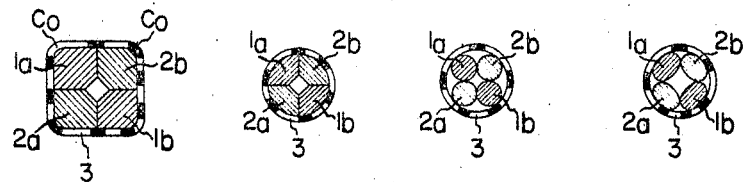
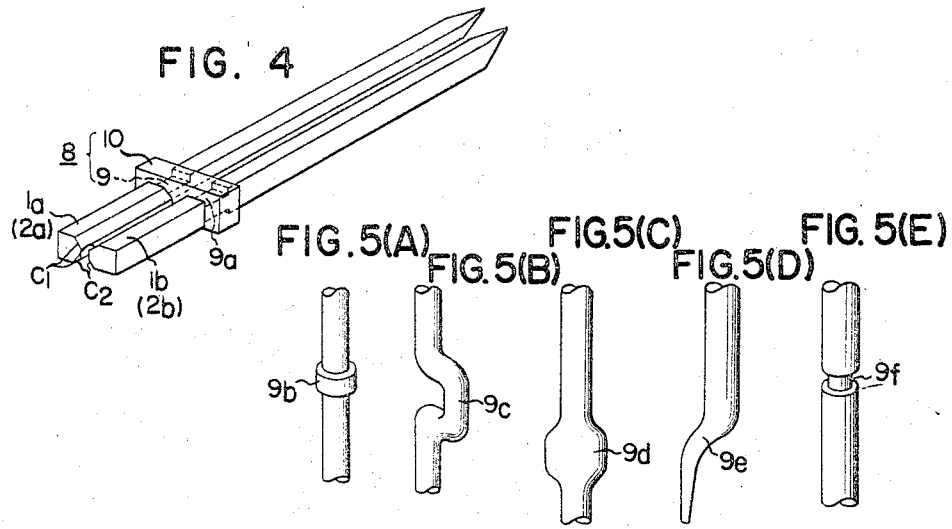
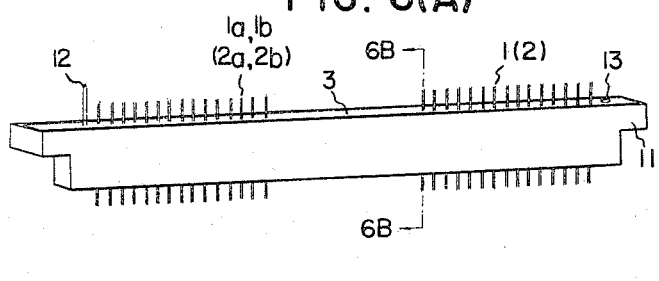
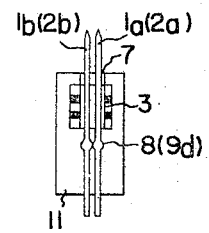

3,427,551
ELECTRICAL PIN CONNECTORS
Shintaro Oshima, Musashino-shi, Tokyo-to, Japan, assignor to Kokusai Denshin Denwa Kabushiki Kaisha, Tokyo-to, Japan, a joint-stock company of Japan
Continuation-in-part of application Ser. No. 303,307, Aug. 20, 1963. This application Sept. 6, 1966, Ser. No. 577,313
U.S. Cl. 339—47
Int. Cl. H01h 25/04, 11/32

5 Claims

ABSTRACT OF THE DISCLOSURE

An electrical connector arrangement in which a plug and receptacle are made of a resilient material in which is disposed a plurality of pin connector members each made of two parallel connectors each having an intermediate straight part or length coactive with another conductor in establishing an electrical connection. The pin connector members are arranged so that the conductors of the plug are at right angles to the conductors on the receptacle. Each pin connector member of the plug is disposed in a bore having a lesser diameter than the overall transverse dimension of the rim connector member portions that effect electrical connection so that when the plug has its pin connector members inserted into a respective bore the resilient material applies an elastic force circumferentially of the pin connector members and biases the conductors thereof toward each other since the force is applied toward the axis of the bore. A uniform force is thereby applied axially and circumferentially of the portions of the conductors defining the electrical connection region of the pin connector members. The pin connector members are anchored in the resilient material axially by stop means that allow the electrical contacting portions to be pivotal relative to the area of the stop means and thus allow the electrical connection.

---

This is a continuation-in-part of my application Ser. No. 303,307, filed on Aug. 20, 1963 and now abandoned.

The present invention relates to electrical connection elements and to electrical connectors including said elements, and more particularly it relates to an electrical connection element provided with a resilient member and to electrical connectors including such connection elements.

In general, in conventional electrical connectors, a kerf is provided either on the plug member or on the jack member and contact pressure between these members is established by elastic force occurring at the base portion of the kerf when the members are coupled with each other. As a result, the contact pressure between the plug and jack members is biased to only one portion along the length of the members because of deformation of the kerf. This ununiform distribution of the contact pressure occurs also in electrical connectors of other type. Furthermore, in the conventional electric connector utilizing plug and jack members, elastic fatigue tends to occur after repetition of coupling and decoupling of the plug and jack members, whereby the contact resistance of said connector is caused to increase or to become unstable. Moreover, since the electric connection element itself has resiliency, and the reliability of the contact and the life thereof depend remarkably upon the accuracy of fit, extremely high precision is required in the fabrication and fixing of each of the component members, thus causing the finished connector to be extremely expensive.

Accordingly, it is an object of this invention to provide electrical connection elements and electrical connectors including these electrical connection elements, which have no disadvantages as described above, can maintain their uniform, stable, and sure contact pressure between their cooperating plug and jack members over their entire contact region, and can be easily mass-produced because of their very simple constructions.

Another object of this invention is to provide a couple of connector units which have substantially identical formation.

The novel features of this invention are set forth with particularity in the appended claims. This invention, however, both as to its construction and formation together with further objects and advantages thereof, may best be understood by reference to the following description, taken in connection with the accompanying drawings, in which the same or equivalent parts are designated by the same reference numerals or letters, and in which:

FIGS. 1(A), 1(B) and 1(C) are perspective views showing, respectively, elemental members composing one embodiment of a connection element according to this invention;

FIG. 1(D) is a perspective view of an embodiment of this invention in which the elemental members illustrated in FIGS. 1(A), 1(B) and 1(C) are coupled;

FIG. 1(E) is a cross sectional view of the embodiment of FIG. 1(D) taken along line E—E;

FIG. 2(B) is a perspective view showing a second pin member and a resilient member of another embodiment of the present invention, said members being cut off, for simple illustration, at their top portions;

FIG. 2(D) is a perspective view showing the coupled relationship of the embodiment of FIG. 2(B), in which the top of the members are cut off, and the resilient member is omitted for simple illustration;

Figure 7A:
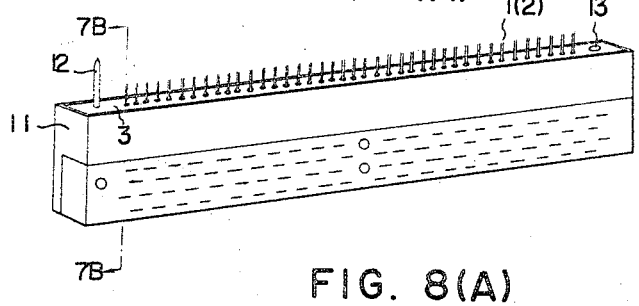
Figure 7B:
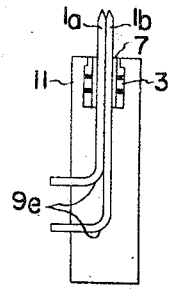
Figure 8A:
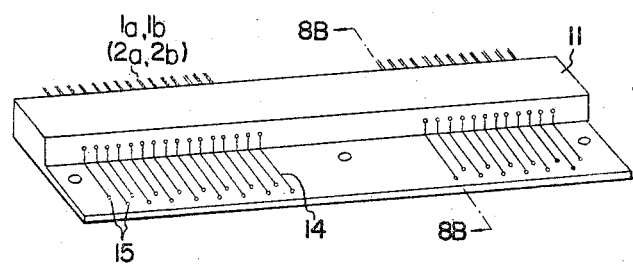
Figure 8B:
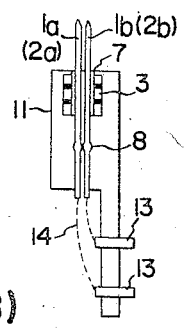

FIGS. 2(A) and 2(C) are, respectively, cross sectional views of the members illustrated in FIGS. 2(B) and 2(D) including the resilient member;

FIGS. 3(A), 3(B), 3(C) and 3(D) are cross setcional views showing further different embodiments according to this invention;

FIG. 4 is a perspective view for explaining a stopper means of a connection element according to this invention;

FIGS. 5(A), 5(B), 5(C), 5(D) and 5(E) are perspective views showing, respectively, other stopper means of different types which can be used in the pin member of this invention;

FIGS. 6(A), 7(A), 8(A) and 9(A) are perspective views showing, respectively, electrical connectors according to this invention; and FIGS. 6(B), 7(B), 8(B) and 9(B) are, respectively, cross sectional views of the embodiments of FIGS. 6(A), 7(A), 8(A) and 9(A).

Referring to FIGS. 1(A), 1(B), 1(C), 1(D) and 1(E), the electrical connection element according to this invention comprises a first pin member 1, a second pin member 2, and a resilient member 3. As shown, respectively, in FIGS. 1(A) and 1(B), each of the first pin member 1 and the second pin member 2 is composed of two electric conductors (1a, 1b or 2a, 2b) arranged closely in parallel. Each of the conductors has one end 4 which is rounded off or tapered off, another end 5 to be connected to a connection line, and a straight intermediate portion 6 provided between the ends 4 and 5. The intermediate portions of the members 1 and 2 are made to contact each other when said members 1 and 2 are coupled so that a plane including the axes of the first pin members 1a and 1b intersects a plane including the axes of the second pin members 2a and 2b as shown in FIG. 1(E). The resilient member 3, as shown in FIGS. 1(C), 1(D) and 1(E), is composed of an elastic material surrounding the members 1 and 2 over about the entire length of contact region between the members 1 and 2. Accordingly, the contact pressure between the first pin member 1 and the second pin member 2 is secured as described below by only the elastic force resulting from deformation of the resilient member 3 in the case of coupling of the members 1 and 2.

The first and second pin members 1 and 2 are preferably made of an electric conductor such as copper or brass conductor, but when, according to necessity, said conductor is provided with a deposited layer of gold or silver, a further improved result can be obtained. If the conductor provided with a conductive layer deposited thereon as described above is used, the members 1 and 2 may be made of a substance of relatively high electric resistance. The resilient member 3 is of an elastic material with a bore 7 and made of a substance, such as rubber, plastic material, or silicone rubber, this resilient member being denoted hereinafter as an elastic tube 3. The internal diameter $r$ of the elastic tube 3 is selected so as to be slightly less than the resultant diameter $R$ of a circle enveloping the first and second pin members 1 and 2 in coupled state. Accordingly, when the first pin member 1 is coupled with the second pin member 2 as shown in FIGS. 1(D) and 1(E), the elastic tube 3 is expanded and deformed, whereby the members 1 and 2 are effectively contacted by an elastic force caused by the deformation of the elastic tube 3. Because of the existence of the tapered portion 4, the plug member 1 is smoothly insertable into the elastic tube 3 in the coupling of the first and second pin members 1 and 2. In the case of FIG. 1, the conductor of each of the members 1 and 2 has a circular section, but this conductor may have any of other sectional forms.

To form an electrical connector, it is necessary that the first and second pin members 1 and 2 be fixed in respective receptacles 11a and 11b of insulation material. According to this invention, a stopper means 8 which will be described in detail below is employed so that the straight conductors of the pin members are secured steadily in the longitudinal directions thereof in the receptacle 11a or 11b but have slight pivotal movability, in the receptacle 11a or 11b, with respect to the stopper means 8.

In FIGS. 2(A), 2(B), 2(C) and 2(D) there is shown an embodiment of this invention in which each of the first pin member and the second pin member is composed of two conductors with polygonal cross-section. In FIGS. 2(A) and 2(B) showing the state in which the first pin member 1 is not yet inserted, the second pin member 2 consists of two square conductors 2a and 2b each having a cut-off corner C. At the cut-off corner surfaces C which are opposed to each other, the conductors 2a and 2b are contacted with each other in the elastic tube 3. The first pin member 1 also consists of two straight conductors 1a and 1b having the same form as the conductors 2a and 2b and inserted between the conductors 2a, 2b within the elastic tube 3, as shown in FIG. 2(C). In this embodiment, since the straight conductors 1a, 1b, 2a and 2b can be pivotally moved with respect to the stopper means which are not shown, and the elastic tube 3 is expanded by the outside corners of the first and second pin conductors 1a, 1b, 2a and 2b, all pin conductors are caused to contact closely along the entire length of the contact surfaces Sa by the contraction stress of the elastic tube 3, this stress acting inwardly, whereby very stable contact can be obtained.

The configurations of the first and second pin members can be modified variously as shown in FIGS. 3(A), 3(B), 3(C) and 3(D). FIG. 3(A) shows an example having conductors which are the same as the conductors illustrated in FIG. 2(C) except that the outside corners Co of the conductors are cut off or rounded, and FIG. 3(B) shows an example having conductors which are formed by dividing a cylinder, in its longitudinal direction, into four equal conductors each having a sector-shaped section and then cutting off their inside corners. FIGS. 3(C) and 3(D) show further embodiments of the invention having, respectively, conductors of circular section and of elliptic section.

While in the embodiments of FIGS. 3(C) and 3(D), line contact is established between the first and second pin members 1 and 2, in the examples illustrated in FIGS. 3(A) and 3(B), surface contact is established between the members 1 and 2.

According to this invention, an electric connector can be constructed by fixing at least one of the pin members (1 or 2) in a receptacle together with the resilient member 3. For the purpose of fixing these members, each of pin members requires a stopper means. One example of such stopper means is illustrated in FIG. 4. In this example, the first pin member 1 (or the second pin member 2) is composed of two electric conductors each of which is made of a square conductor, two adjacent corners $C_1$ and $C_2$ of which are cut off. These conductors are provided with a stopper means 8 consisting of notches 9 and 9a and a supporter 10 held in these notches, the supporter being secured steadily in the longitudinal direction of the pin members 1 (or 2). Moreover, it is preferable as mentioned above to fix the pin members 1 and 2 so that they have slight pivotal movability with respect to the stopper means 8 even though the supporter 10 is completely fixed in the receptacle 11a or 11b as shown in FIGS. 1(A), 1(B) and 1(D).

Various other examples of the stopper are illustrated in FIG. 5, in which are used conductors having a circular section. However, conductors having other sections can be adopted with the same result. In FIGS. 5(A), 5(B), 5(C), 5(D) and 5(E) there are shown, respectively, a conductor provided with a flange 9b, a conductor provided with a bend 9c, a conductor provided with a flattened portion 9d, a conductor having a bent end 9e, and a conductor provided with a notch 9f as in the case of FIG. 4. In each case, a suitable conductor with stopper means 8 from among the above-mentioned conductors may be selected in accordance with the form of the conductor and object of the electrical connector consisting of the combination of electrical connection elements.

The electrical connector comprising a pair of coupled connection units which are identical to each other except for a little distinction will be described. Examples of the electrical connector utilizing the above-mentioned electrical connection elements are illustrated in FIGS. 6, 7 and 8, respectively. Although FIGS. 6, 7 and 8 relate to the illustrations in which the first or second pin members are all composed of two conductors with circular cross-section, conductors of any other form may be used for these members. The connection unit of FIG. 6 comprises a plurality of the pin members (1 or 2) which are arranged in parallel and the resilient member 3 embracing the pin members (1 or 2). For the resilient member 3, a plurality of resilient tubes 3 or a common block of resilient material provided with a plurality of parallel bores 7 into which the pin members are to be inserted is used. The aforementioned stopper means of all of the pin members (1 or 2) and the resilient member or members are supported in a receptacle 11 of insulation material. When a pair of the identical connection units each as described above are coupled to each other, the respective pairs of the first and second pin members form independently stable contact circuits. In this embodiment, when the pin members of one unit are arranged so that a plane including the axes of the pin members is parallel to the longitudinal direction of the receptacle 11, the pin members of the other unit are arranged so that planes including the axes of the respective pin members are transverse to the longitudinal direction of the receptacle 11. Accordingly, respective pairs of the pin members can be coupled as illustrated in FIGS. 3(A) to 3(D). Furthermore, in the embodiment of FIG. 6, if a pin 12 and a hole 13 are respectively provided at both ends in order to make said pin and hole function as a guide device, reinforcing of the device can be improved. In this connection unit, the resilient member 3 has the same function as the tubular member 3 described with reference to FIGS. 1(C), 1(D), 2(A), 2(B), 2(C), 3(A), 3(B), 3(C) and 3(D).

FIG. 7 relates to an embodiment of the invention in which the pin members (1 or 2) each of which has a bent end 9e are used. In this embodiment of FIG. 7, outside connection terminals can be led out laterally so as to be directly connected to a panel with printed circuits.

FIG. 8 relates to an embodiment of the invention in which a flexible connection wire 14 such as, for example, a printed wire printed on a plastic resin sheet is connected between each outside connection terminal 15 and each end of the pin members (1 or 2), whereby the pivotal movability of each pin member is caused to be unaffected, thereby to obtain an excellent result.

Figure 9A:
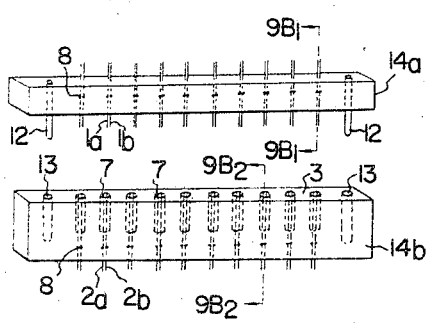
Figure 9B:
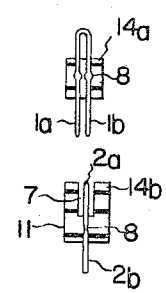

FIGS. 9(A) and 9(B) show a further embodiment of the electrical connector of this invention, in which at the upper side of the illustration is shown a plug member, and at the lower side is shown a jack member. In this embodiment, the first pin members and the second pin members are respectively secured in resilient block member 16a and 16b of appropriate hardness without any other receptacle means. The resilient block member 16b supporting the second pin members 2a and 2b have a plurality of bores 7 each for seating the tips of the respective second pin members 2a and 2b and for receiving the tips of the respective first pin members 1a and 1b when the plug member and the jack member are coupled to each other. Each of the pin members (1a and 1b) and 2a and 2b) has stopper means 8 for securing it in the resilient block members 16a and 16b, so that the respective conductor of the pin member is secured steadily in the longitudinal directions in the resilient block members 16a and 16b but has slight pivotal movability with respect to the stopper means.

While in the above descriptions and illustrations, each of the first and second pin members is composed of two straight conductors, they may be formed by a single conductor folded as shown in FIG. 9(B).

The resilient block members 16a and 16b for encompassing coupled straight parts of the pin members may be separate from such receptacle means of the pin member as shown in the preceding embodiments. If the members 16a and 16b are associated with the receptacle means of the pin member, it is combined with only the receptacle 11b of the second pin members as shown in FIGS. 9(A) and 9(B) or separately combined with both of the receptacles 11 of the first and second pin members as shown in FIGS. 6(A), 6(B), 7(A), 7(B), 8(A) and 8(B).

As described above, since in the electrical connection elements according to this invention and the electrical connector including said elements, the pin members are embraced by a resilient member, and uniform contact pressure is distributed over almost all contact regions of the conductors by the elastic force of this resilient member, contact resistance is rendered very low and stable, whereby the elastic fatigue is reduced and excellent contact can be always secured. Furthermore, since the electrical connection elements and connector of this invention are simple in construction and have a relatively lenient requirement for their structural accuracy because of their slight pivotal movability, inexpensive mass-production thereof can be realized.

Since it is obvious that many changes and modifications can be made in the above described details without departing from the nature and spirit of the invention, it is to be understood that the invention is not to be limited to the details described herein except as set forth in the appended claims.

I claim.

1. An electrical connector arrangement comprising, a receptacle made of a resilient member, a plug made of a resilient member for effecting electrical connection therewith, said receptacle and said plug each comprising a pin connector member, said plug and said receptacle each having a bore extending therethrough, each pin connector member comprising two electrically conductive conductors arranged in parallel and each of said two conductors extending axially through said bore, each conductor having one end for connection to a source of electric current and a length as an opposite end thereof free of said resilient member, said resilient member comprising said receptacle having a portion of its bore in which the respective pin connector member is axially disposed and for receiving the pin connector member of said plug, said plug conductors of each pin conductor member having a straight portion intermediate the ends thereof comprising said length free of said resilient member, the transverse dimension of said portion of said bore when free of said conductors being slightly less than an overall transverse dimension of the straight portion of said conductors, stop means on each conductor received internally of said bore holding the conductor axially in said resilient member allowing slight pivotal mobility relative to said resilient member, each conductor having on said straight portion intermediate the ends of said conductor a surface for effecting an electrical connection with a surface on a length of another one of the conductors intermediate portions when said plug is inserted in said receptacle, each of said straight portions of each conductor being a separate length from its corresponding straight portion defining a given conductor and extending away from said stop means, the pin connector member in said plug having the conductors in a plane passing through the two conductors thereof and normal to a plane passing through the two conductors of said pin connector member of said receptacle when said plug pin connector member is inserted in said portion of said bore of said receptacle, whereby when the pin connector member of said plug is inserted into said portion of said bore axially effecting contact along the straight portion of the pin connector members resilient material defining said portion of said bore develops an elastic force acting circumferentially of said conductors and inwardly toward the axis of said bore and the conductors defining said pin connector members are biased toward said axis and are elastically in contact under a uniform pressure circumferentially and axially of said straight portions effecting electrical connection along contacting surfaces of the straight portions of the connector pin member conductors.

2. An electrical connector arrangement according to claim 1, in which said surface of said conductors is flat.

3. An electrical connector arrangement according to claim 1, in which said surface of said conductor is arcuate.

4. An electrical connector arrangement according to claim 1, in which the resilient material defining said bore is an integral part of the resilient member comprising said receptacle.

5. An electrical connector arrangement according to claim 1, in which said plug and receptacle comprise pluralities of other pin connector members constructed similarly to said pin connector members, and said receptacle comprising a plurality of bores effective to effect electrical contact between said pluralities of pin connector members similarly to said bore.

(References on following page)

References Cited

UNITED STATES PATENTS

| | | | |
|---|---|---|---|
| 1,959,302 | 5/1934 | Paige | 339—47 |
| 2,434,226 | 1/1948 | Reynolds | 339—47 |
| 2,441,393 | 5/1948 | Buchanan et al. | |
| 2,460,231 | 1/1949 | Matthysse | 339—47 |
| 3,275,967 | 9/1966 | Hamm | 339—61 |

FOREIGN PATENTS

| | | |
|---|---|---|
| 1,063,811 | 12/1953 | France. |
| 475,757 | 5/1929 | Germany. |
| 20,685 | 9/1898 | Great Britain. |
| 4,974 | 3/1905 | Great Britain. |
| 675,587 | 7/1952 | Great Britain. |

MARVIN A. CHAMPION, *Primary Examiner.*

JOSEPH H. McGLYNN, *Assistant Examiner.*

U.S. Cl. X.R.

339—61, 252